United States Patent [19]
Jovanovic et al.

[11] Patent Number: 5,959,438
[45] Date of Patent: Sep. 28, 1999

[54] SOFT-SWITCHED BOOST CONVERTER WITH ISOLATED ACTIVE SNUBBER

[75] Inventors: Milan M. Jovanovic; Yungtaek Jang, both of Blacksburg, Va.

[73] Assignee: Delta Electronics, Inc., Taipei, Taiwan

[21] Appl. No.: 09/005,204

[22] Filed: Jan. 9, 1998

[51] Int. Cl.⁶ .................................................. G05F 1/56
[52] U.S. Cl. .............................. 323/222; 363/21; 363/25
[58] Field of Search .................................. 323/222, 282, 323/285, 286, 287; 363/16, 20, 21, 24, 25, 97

[56] References Cited

U.S. PATENT DOCUMENTS

| | | | |
|---|---|---|---|
| 5,287,261 | 2/1994 | Ehsani | 323/222 |
| 5,293,111 | 3/1994 | Weinberg | 323/222 |
| 5,418,704 | 5/1995 | Hua et al. | 363/21 |
| 5,486,752 | 1/1996 | Hua et al. | 323/222 |
| 5,726,869 | 3/1998 | Yamashita et al. | 363/21 |
| 5,736,842 | 4/1998 | Jovanovic | 323/222 |

OTHER PUBLICATIONS

Robert Streit and Daniel Tollik, "High Efficiency Telecom Rectifier Using A Novel Soft–Switched Boost–Based Input Current Shaper" *INTELEC '91,* Nov. 1991, pp. 720–726.

Guichao Hua, Ching–Shan Leu, and Fred C. Lee, "Novel Zero–Voltag–Transition PWM Converters" *IEEE,* Mar. 1992, pp. 55–61.

John A. Bassett, "New, Zero Voltage Switching, High Frequency Boost Converter Topology for Power Factor Correction" *IEEE,* 1995, pp. 813–820.

Cláudio M. Duarte and Ivo Barbi, "A New Family Of ZVS–PWM Active–Clamping DC–To–DC Boost Converters: Analysis, Design, And Experimentation" *IEEE,* 1996, pp. 305–312.

Milan M. Jovanovic, "A Technique For Reducing Rectifier Reverse–Recovery–Related Losses In High–Voltage, High--Power Boost Converters" *IEEE,* 1997, pp. 1000–1007.

Koosuke Harada and Hiroshi Sakamoto, "Switched Snubber for High Frequency Switching" *IEEE,* 1990, pp. 181–188.

*Primary Examiner*—Peter S. Wong
*Assistant Examiner*—Derek J. Jardieu
*Attorney, Agent, or Firm*—Skjerven, Morrill, MacPherson, Franklin & Friel; Edward C. Kwok

[57] ABSTRACT

A boost converter employs an isolated active snubber to reduce the losses caused by the reverse-recovery characteristic of a boost rectifier and the turn-on discharge loss of the output capacitance of the boost switch. The losses are reduced by inserting the primary winding of a coupled-inductor in the series path of the boost switch and the rectifier, to control the rate of current change (i.e., the di/dt rate) of the rectifier during its turn-off, and to create the conditions for zero-voltage turn-on for the boost switch. The energy from the inductor, after the boost-switch is turned off, is delivered to the output via the secondary winding of the coupled-inductor which is connected in series with a clamping capacitor and an auxiliary switch to form an isolated active snubber. The same technique can be extended to any member of the PWM-converter family.

16 Claims, 7 Drawing Sheets

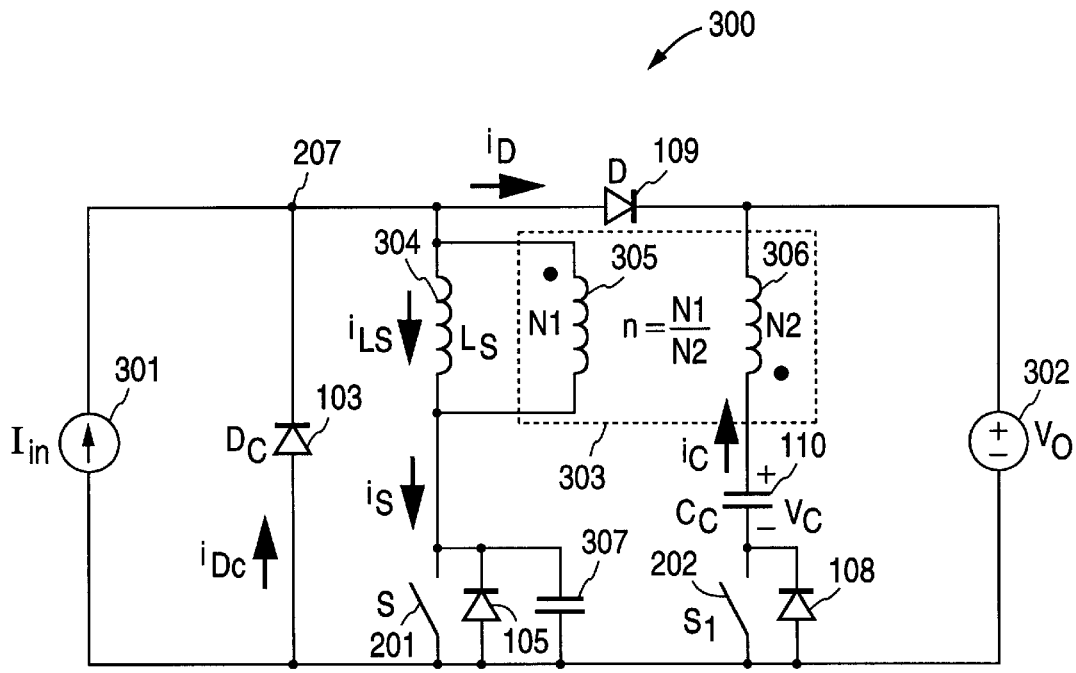
FIG. 3
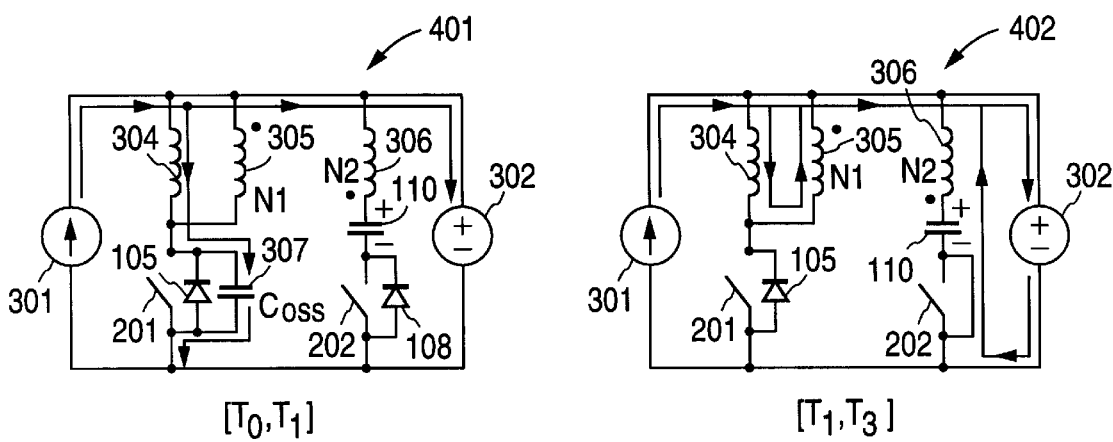
FIG. 4A  FIG. 4B

SOFT-SWITCHED BOOST CONVERTER WITH ISOLATED ACTIVE SNUBBER

CROSS REFERENCE TO RELATED APPLICATIONS

This patent application is related to copending patent application ("Copending Application"), entitled "Techniques for Reduced Rectifier Reverse-Recovery-Related Losses in High-Voltage, High-Power Converters," Ser. No. 08/679,601, filed on Jul. 11, 1996, assigned to Delta Electronics, Inc., which is also the Assignee of the present patent application. The disclosure of the Copending Application is hereby incorporated by reference in its entirety.

BACKGROUND OF THE INVENTION

1. Field of the Invention

The present invention relates to boost converter circuits with reduced switching losses.

2. Discussion of the Related Art

Generally, at higher power levels, the continuous-conduction-mode boost converter is the preferred topology for implementing a front-end converter for active input-current shaping. The output voltage of a boost input-current shaper is relatively high since the dc-output voltage of the boost converter must be higher than the peak input voltage. Because of this high output voltage, the boost converter requires a fast-recovery rectifier. At high switching frequencies, a fast-recovery rectifier produces significant reverse-recovery-related losses when switched under "hard" switching conditions. As a result, to avoid a significant deterioration of conversion efficiency, a hard-switched, boost input-current shaper operates only at relatively low switching frequencies. Soft-switching techniques are developed to increase the switching frequency and the power-density of the front-end boost converter.

A soft-switched boost converter typically uses an active snubber consisting of an auxiliary active switch with a few passive components (inductors and capacitors). The active snubber controls the rate of change of the rectifier current ("di/dt") and creates soft-switching conditions (e.g., zero-voltage switching (ZVS) conditions) for the boost switch and the rectifier.

Some examples of soft-switched boost converters can be found in (i) "High efficiency telecom rectifier using a novel soft-switched boost-based input current shaper," by R. Streit and D. Tollik, International Telecommunication Energy Conf. (INTELEC) Proc., pp. 720–726, October 1991; and (ii) "Novel zero-voltage-transition PWM converters," by G. Hua et al., IEEE Power Electronics Specialists' Conf. (PESC) Rec., pp. 55–61, June 1992. In these examples, a snubber inductor connected to the common node of the boost switch and the rectifier controls the rate of change of the rectifier's current. Because of the snubber inductor's location, the boost switch and the rectifier experience minimum voltage and current stresses. In addition, the boost switch and the rectifier turns on and turns off, respectively, under ZVS conditions. In these examples, however, the auxiliary switch operates under hard-switching conditions, being turned on while its voltage is equal to the output voltage, and being subsequently turned off while carrying a current greater than the input current.

In these circuits disclosed by Streit and Tollik, and Hua et al., a severe resonance can occur between the output capacitance ($C_{oss}$) of the auxiliary switch and the resonant inductor, after the auxiliary switch is open and the snubber inductor current falls to zero. This resonance adversely affects the proper operation of the circuit and must be eliminated. To minimize this resonance, Hua et al. provide an additional rectifier and a saturable inductor in series with the snubber inductor. However, the additional components degrade conversion efficiency and increase the cost of the circuit.

Other examples of soft-switching boost converters can be found in (i) "New, zero voltage switching, high frequency boost converter topology for power factor correction," by J. Bassett, International Telecommunication Energy Conf. (INTELEC) Proc., pp. 813–820, 1995; (ii) "A new family of ZVS-PWM active-clamping dc-to-dc boost converters: analysis, design, and experimentation," by C. M. C. Duarte et al., International Telecommunication Energy Conf. (INTELEC) Proc., pp. 305–312, 1996; and (iii) "A technique for reducing rectifier reverse-recovery-related losses in high-voltage, high-power boost converters," by M. Jovanovic, IEEE Applied Power Electronics (APEC) Conf. Proc., pp. 1000–1007, 1997. In these examples, the rate of change of the rectifier current is controlled by a snubber inductor connected in series with the boost switch and the rectifier. Because of this snubber inductor's location, the voltage stress of the boost switch is higher than that of the boost switches in the circuits described by Streit and Tollik, and Hua et al. discussed above. This increased voltage stress can be minimized by carefully selecting both the inductance value for the snubber inductor and the switching frequency. For properly designed converters, the boost and the auxiliary switches in the circuits of Bassett, Duarte et al., and Jovanovic operate under ZVS conditions.

An example of such boost converters is boost converter 100 shown in FIG. 1, which is described in the Jovanovic reference mentioned above. As shown in FIG. 1, boost converter 100 includes boost inductor 102, boost switch 106, boost rectifier 109, and output filter capacitor 111 configured in a conventional boost converter configuration. The input and output ports of boost converter 100 are respectively an input voltage source 101 and a resistor 112 representing the load of circuit 100. In addition, an inductor 104 is provided in series connection with boost switch 106, between boost switch 106 and the common node 114 of boost inductor 102 and boost rectifier 109. An auxiliary switch 107 is provided to couple a clamping capacitor 110 between output node 113 and boost switch 106. Two anti-parallel diodes (internal body diodes of the MOSFETs), represented in FIG. 1 as rectifiers 105 and 108, are provided across boost switch 106 and auxiliary switch 107, respectively. An additional rectifier 103 is provided to clamp common node 114 to the lower supply voltage at node 115.

These circuits described by Bassett, Duarte et al., and Jovanovic, such as boost converter 100 above, require either (i) an isolated (high-side) gate drive, if the auxiliary switch is an N-channel MOSFET, or (ii) a P-channel MOSFET, if a non-isolated (direct, low-side) drive is to be used. Either choice, i.e., an isolated gate drive or a P-channel MOSFET, increases circuit complexity and cost. Furthermore, both Duarte's and Jovanovic's circuits require precise and noise-robust gate-drive timing, as accidental overlapping of the main and auxiliary switch gate drives may result in a catastrophic failure due to the large transient current in the main and auxiliary switches simultaneously. Furthermore, the Duarte's circuit also suffers from a parasitic resonance between the rectifier's junction capacitance and the snubber inductor, which significantly increases the voltage stress on the rectifier. Thus, Duarte's circuit requires a rectifier with a higher voltage rating, which further increases the cost of the circuit and reduces its conversion efficiency.

SUMMARY OF THE INVENTION

The present invention provides a technique which improves the performance of the boost converter by reducing both the reverse-recovery-related losses in the boost switch and the rectifier, and the capacitive turn-on switching loss of the boost switch. This technique reduces the reverse-recovery-related losses by controlling the rate of change of the rectifier current with a coupled-inductor snubber whose primary winding is connected in series with the boost switch and rectifier. In addition, the energy stored in the inductor completely discharges the output capacitance of the boost switch prior to the boost switch turning on, thus eliminating the boost switch's capacitive turn-on switching loss. When the boost switch is turned off, the discharging path of the snubber inductor current (i.e., energy) is provided by a serially connected auxiliary switch and a clamping capacitor. This auxiliary switch and the clamping capacitor are connected to the output terminal of the converter through a secondary winding of the snubber inductor. As a result, the active-snubber circuit, which consists of a series connection of the snubber inductor, the clamping capacitor and the auxiliary switch, can be implemented with an auxiliary switch having a source terminal referenced to ground. Consequently, a non-isolated (direct) gate drive can be used in this auxiliary switch. Since the main and auxiliary switches are not connected in series, the boost and auxiliary switches are not subjected to high transient currents due to an accidental overlapping of the main and auxiliary switch gate drives.

In one embodiment of the present invention, a converter of the present invention, includes: (a) an inductor having a first terminal coupled to an input terminal of the boost converter; (b) a rectifier coupled between the second terminal of the inductor and an output terminal; (c) first and second switches; (d) a capacitor; and (e) a coupled-inductor having a first winding and a second winding. In that embodiment, the first winding couples the first switch and the rectifier in a first series connection between a ground reference terminal and the output terminal, and the second winding couples the second switch and the capacitor in a second series connection between the ground reference terminal and the output terminal.

The present invention is applicable to many converter configurations, such as flyback, SEPIC and multi-phase boost rectifier, and other isolated or non-isolated pulse-width modulated (PWM) converters.

The present invention is better understood upon consideration of the detailed description below and the accompanying drawings.

BRIEF DESCRIPTION OF THE DRAWINGS

FIG. 3 is a simplified circuit model 300 of boost power stage 200, showing reference directions of currents and voltages.

FIGS. 4(a)–4(h) show respectively topological stages 401–408 of circuit model 300.

DETAILED DESCRIPTION OF THE PREFERRED EMBODIMENTS

Figure 1:
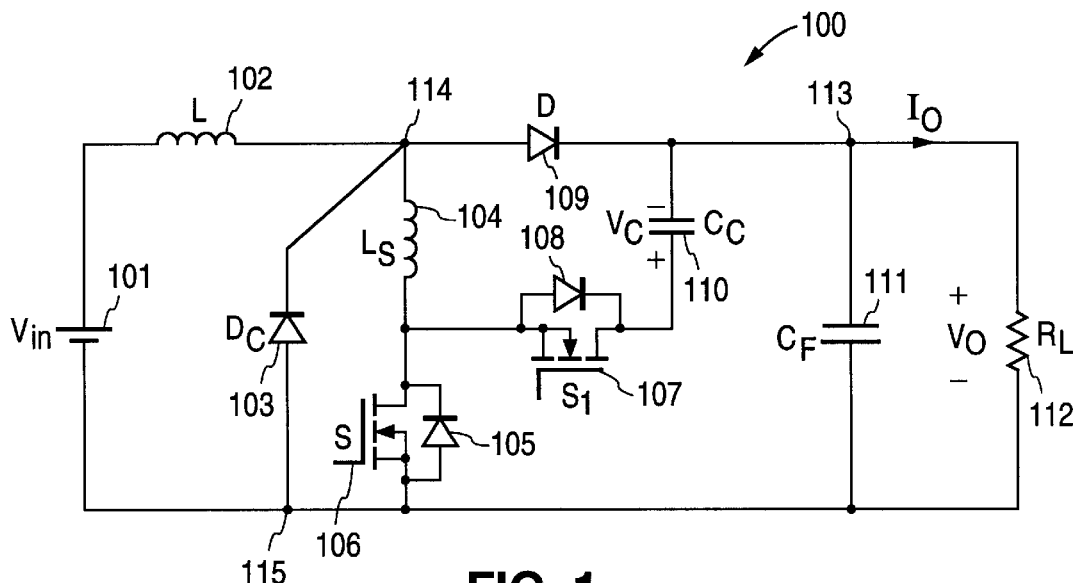
FIG. 1 shows a boost power stage 100 with non-isolated active snubber (prior art).
Figure 2A:
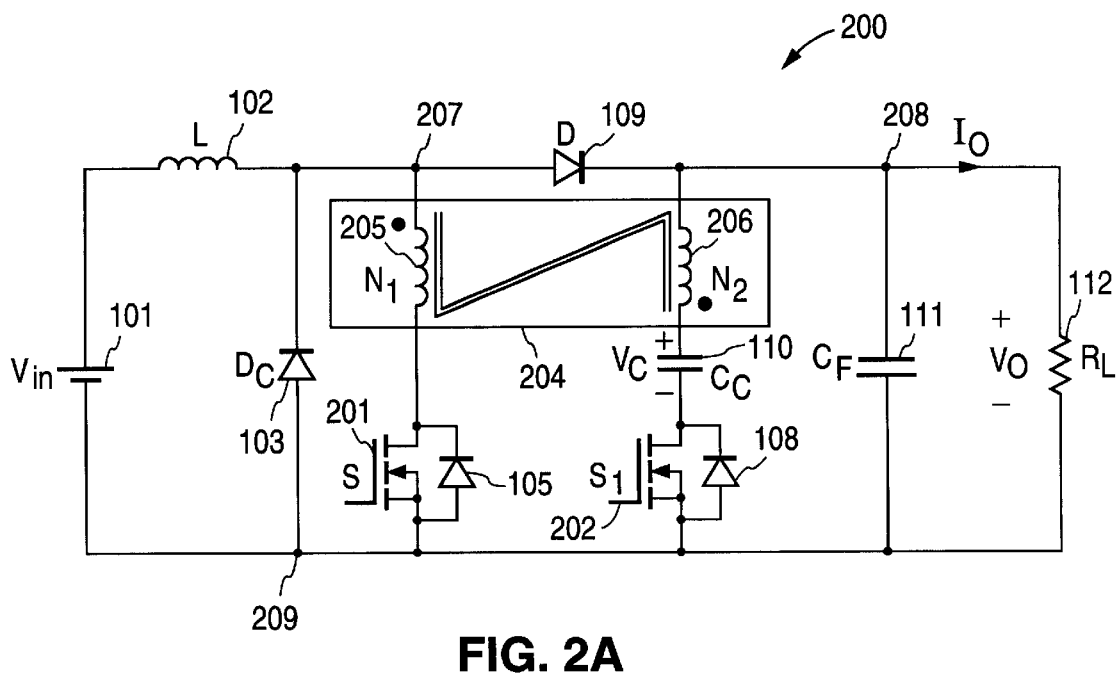
FIG. 2a shows a boost power stage 200 with isolated active snubber, provided in accordance with the present invention.

The present invention provides a boost converter using a novel reverse-recovery-loss reduction technique. One embodiment of the present invention is provided in boost converter 200 shown in FIG. 2a. (To facilitate comparison between figures in this description, like reference numerals in the figures denote like elements). As shown in FIG. 2a, boost converter 200 includes boost inductor 102, boost switch 201, boost rectifier 109, and output filter capacitor 111 configured as shown. The input and output ports of boost converter 200 are respectively an input voltage source 101 and a resistor 112 representing the load of circuit 200. A coupled-inductor 204 is provided with its primary winding 205 connected between boost switch 201 and the common node 207 of boost inductor 102 and boost rectifier 109 to control the rate of change of current in boost rectifier 109. An auxiliary switch 202 is provided to couple clamping capacitor 110 between output node 208 and lower voltage supply node 209 ("ground reference") through the secondary winding 206 of coupled-inductor 204. When auxiliary switch 202 is closed, the energy in primary winding 205 of coupled-inductor 204 is discharged to output node 208 through the isolated active snubber consisting of auxiliary switch 202, clamping capacitor 110, secondary winding 206 of coupled-inductor 204. Two anti-parallel diodes (e.g., internal body diodes of the MOSFETs) 105 and 108 are provided across boost switch 201 and auxiliary switch 202, respectively. An additional rectifier 103 is provided to clamp common node 207 to the lower supply voltage at node 209, so as to eliminate any parasitic ringing between the junction capacitance of rectifier 109 and the magnetizing inductance of coupled-inductor 204. Auxiliary switch 202 can be implemented by a ground-referenced N-MOSFET.

To illustrate the operation of boost converter 200, a simplified circuit model 300 is provided in FIG. 3. In this embodiment, boost inductor 102 is provided to be sufficiently large that voltage source 101 and boost inductor 102 can be modeled by constant-current source 301, and that the output ripple voltage is negligible so that the voltage across both the output filter capacitor 111 and load resistor 112 can be represented by constant-voltage source 302. Switches 201 and 202, which can be implemented by semiconductor switches (e.g., MOSFETs), are assumed to have negligible resistance when closed. However, the output capacitance 307 of switch 201 and the reverse-recovery charge of rectifier 109 are not neglected. Coupled-inductor 204 is modeled by the parallel combination of a magnetizing inductance 304 and an ideal transformer 303 having primary and secondary windings 305 and 306, respectively, with a turns ratio $n=N_1/N_2$, where $N_1$ and $N_2$ are the turns of coupled-inductor 204's primary and secondary windings 205 and 206, respectively.

Figure 4C:
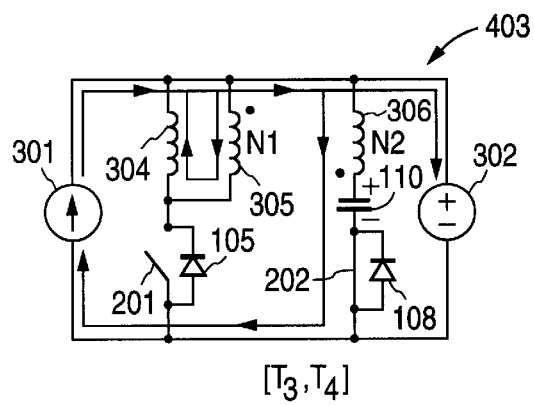
Figure 4D:
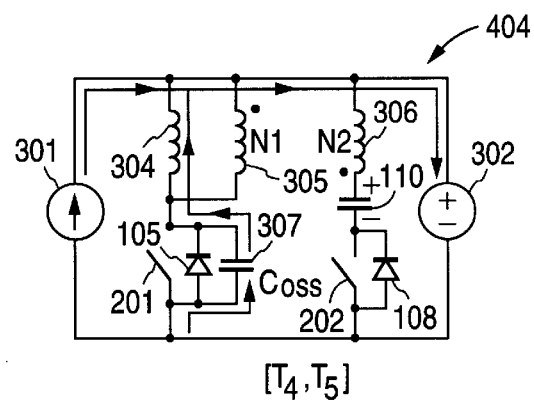
Figure 4E:
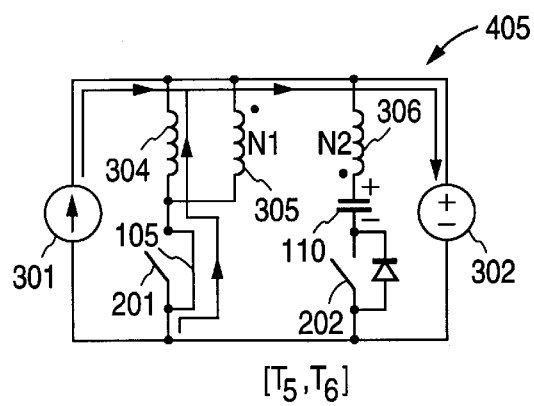
Figure 4F:
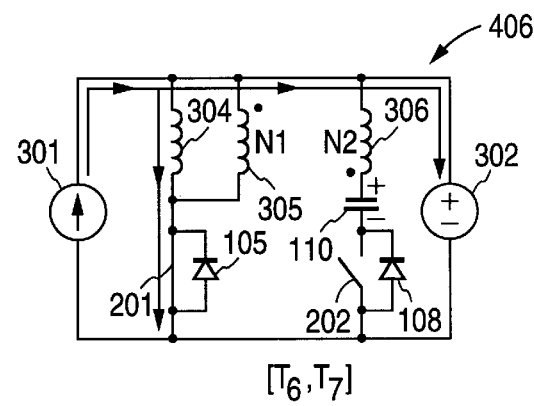
Figure 4G:
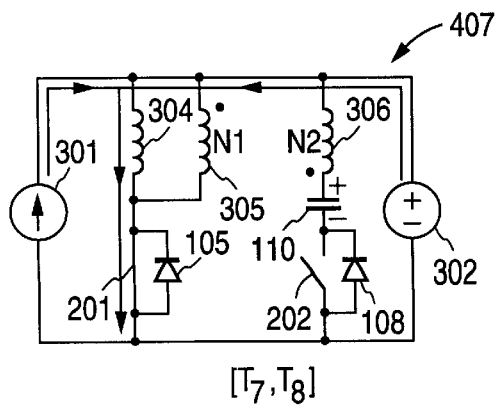
Figure 4H:
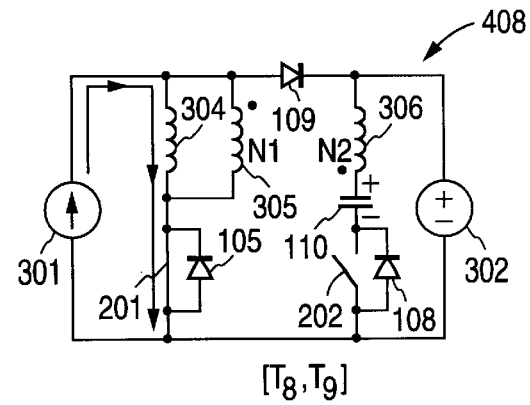
Figure 5:
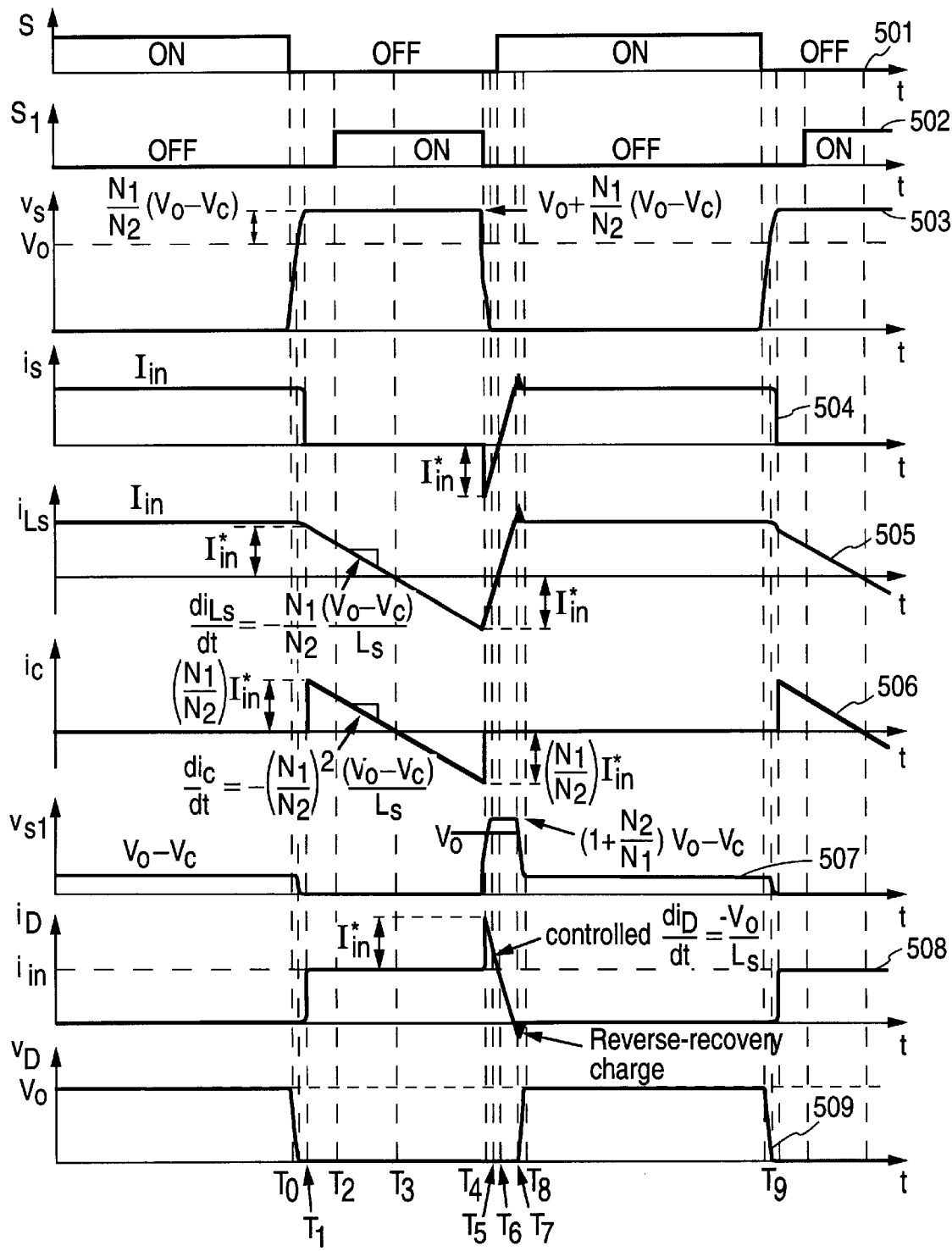
FIG. 5 shows key waveforms of circuit model 300.

The operations of boost converter 200 is illustrated in FIGS. 4(a)–4(h) by the topological stages 401–408 of circuit model 300, and by the power-stage key waveforms 501–509 of FIG. 5. In this analysis, it is assumed that: (i) the junction capacitance of boost rectifier 109 is negligible (explained below), and clamp rectifier 103 can be ignored, since it never conducts. In FIG. 5, voltage waveforms 501 and 502, representing the control voltages for boost and auxiliary switches 201 and 202 respectively, show that switches 201 and 202 are not closed simultaneously.

As shown in FIG. 5, prior to time $T_0$, boost switch 201 is closed (waveform 501), and the input current $I_{in}$ of current source 301 flows through inductor 304 (waveform 505 represents current $i_{Ls}$ in inductor 304) and switch 201. At the same time, rectifier 109 is reversed biased, the voltage $V_D$ (waveform 509) across the terminals of rectifier 109 is a reverse voltage equal to output voltage $V_O$. Auxiliary switch 202 is open (waveform 502), so that voltage $v_{s1}$ across auxiliary switch 202 is equal to $V_O-V_C$, where $V_C$ is the voltage across clamping capacitor 110.

Between time $t=T_0$ and $t=T_1$, as shown in FIGS. 4(a) and 5, boost switch 202 is open, and the input current $I_{in}$ which was flowing through boost switch 201 charges output capacitance 307 ($C_{OSS}$) of boost switch 201. Consequently, the voltage $V_s$ (waveform 503) across boost switch 201 increases linearly. At the same time, voltage $V_{S1}$ (waveform 507) across auxiliary switch 202 decreases from $V_O-V_C$ towards zero. When $V_s$ across boost switch 201 reaches $V_O$, rectifier 109 is forward biased and begins to conduct (waveform 508, showing the current $I_D$ in rectifier 109). Because the current $I_{LS}$ (waveform 505) in inductor 304 continues to charge capacitor 307 after voltage $v_S$ across boost switch 201 reaches $V_O$, voltage $V_S$ increases above $V_O$, causing current $I_{LS}$ through inductor 304 to decrease. At time $t=T_1$, voltage $v_{s1}$ across auxiliary switch 202 reaches zero, i.e., the antiparallel diode 108 of switch 202 begins to conduct.

Between times $t=T_1$ and $t=T_3$, as shown in FIG. 4(b), inductor current $i_{Ls}$ is diverted into clamping capacitor 110 through the magnetic coupling of windings 305 and 306. During this time, the current $i_C$ (waveform 506) in clamping capacitor 110 has a magnitude given by $i_C=(N_1/N_2)i_{Ls}=ni_{Ls}$, i.e., during this time period, current $i_C$ is proportional to inductor current $i_{Ls}$ in inductor 304. Also, at $t=T_1$, voltage $v_s$ (waveform 503) across boost switch 201 reaches a maximum magnitude of $V_O+(N_1/N_2)(V_O-V_C)$.

Between times $t=T_1$ and $t=T_3$, as shown in FIG. 4(b), inductor current $i_{Ls}$ (waveform 505) continues to decrease as the energy stored in inductor 304 continues to be transferred into clamping capacitor 110. For a suitably large clamping capacitance ($C_C$) selected for clamping capacitor 110, the voltage $V_C$ across clamping capacitor 110 can be treated as substantially constant, so that inductor current $i_{Ls}$ (waveform 505) in inductor 304 and capacitor current $i_C$ (waveform 506) in clamping capacitor 110 both decrease substantially linearly. Since the voltage across boost switch 201 at time $t=T_1$ is $V_O+(N_1/N_2)(V_O-V_C)$, the rate of change of inductor current $i_{Ls}$ is thus given by $di_{Ls}/dt=-(N_1/N_2)((V_O-V_C)/L_s)$, where $L_s$ is the inductance of inductor 304. According to the relationship between capacitor current $i_C$ and inductor current $i_{Ls}$ discussed above, the rate of change of capacitor current $i_C$ is thus given by $di_C/dt=-(N_1/N_2)^2(V_O-V_C)/L_S$. (If clamping capacitance $C_c$ is not sufficiently large, currents $i_{Ls}$ and $i_C$ decrease in a resonant fashion).

At time $t=T_3$, when current $i_C$ in clamping capacitor 110 reaches zero, the antiparallel diode 108 of auxiliary switch 202 stops conducting. To take advantage of the opportunity to turn on auxiliary switch 202 under ZVS conditions, auxiliary switch 202 is closed between times $t=T_1$ and $t=T_3$, i.e., while antiparallel diode 108 is conducting and voltage $v_{s1}$ across auxiliary switch 202 is zero. As shown in FIG. 5, auxiliary switch 202 is closed at $t=T_2$.

As shown in FIG. 4(c), current $i_C$ in clamping capacitor 110 continues to flow after $t=T_3$ in the opposite direction through the closed auxiliary switch 202. Due to the coupling of primary and secondary windings 305 and 306, inductor current $i_{Ls}$ in inductor 304 also continues to flow in the opposite direction after time $t=T_3$, as shown in FIG. 4(c). Thus, the energy stored in clamping capacitor 110 during time interval $[T_1-T_3]$ is returned to inductor 304 in the opposite direction until time $t=T_4$, when auxiliary switch 202 is opened.

At time $t=T_4$, as shown in FIG. 4(d), auxiliary switch 202 is open, capacitor current $i_C$ in clamping capacitor 110, and hence the current through secondary winding 306, are interrupted. Consequently, the current in primary winding 305 also goes to zero abruptly. Inductor current $i_{Ls}$ is thus forced to be drawn from output capacitance 307 of boost switch 201, as shown in FIG. 4(d). Also, at time $t=T_4$, due to opening of auxiliary switch 202, the voltage $v_{s1}$ of auxiliary switch 202 and the current $i_D$ in boost rectifier 109 increase abruptly from zero to $V_O-V_C$, and from $I_{in}$ to $I_{in}+I_{in}^*$, respectively. ($I_{in}^*$ is the instantaneous current through inductor 304 at time $t=T_1$, when voltage $v_s$ across boost switch 201 reaches maximum). Since inductor current $i_{Ls}$ discharges output capacitance 307 of boost switch 201, voltage $v_s$ across boost switch 201 thus decreases from $V_O+(N_1/N_2)(V_O-V_C)$ towards zero. Current $i_{Ls}$ (waveform 505) of inductor 304 increases toward zero and the current $i_D$ (waveform 508) in rectifier 109 decreases toward $I_{in}$, as shown in FIG. 5.

The voltage $v_S$ across boost switch 201 decreases to zero if the energy in inductor 304 at time $t=T_4$ is greater than the energy required to discharge capacitor 307 from $V_O+(N_1/N_2)(V_O-V_C)$ to zero:

$$\frac{1}{2}L_S[i_{LS}(t=T_4)]^2 \geq \frac{1}{2}C_{oss}\left[V_O+\frac{N_1}{N_2}(V_O-V_C)\right]^2 \quad (1)$$

Otherwise, if boost switch 201 is closed immediately after voltage $v_s$ reaches its minimum, voltage $V_s$ does not reach zero, and tends to oscillate around voltage $V_O$ level.

Assuming the condition of equation (1) above holds, voltage $v_S$ across boost switch 201 reaches zero at time $t=T_5$. At that time, current $i_{Ls}$ of inductor 304 remains negative. Consequently, as shown in FIG. 4(e), antiparallel diode 105 across boost switch 201 begins to conduct. Because both antiparallel diode 105 across boost switch 201 and rectifier 109 are conducting, output voltage $V_O$ appears across inductor 304, such that current $i_{Ls}$ in inductor 304 increases linearly toward zero, as shown in FIG. 5. To take advantage of closing boost switch 201 under a ZVS condition, boost switch 201 is closed during the time interval $[T_5-T_6]$, when antiparallel diode 105 across boost switch 201 is conducting. FIG. 5 shows boost switch 201 being closed at time $t=T_6$.

As shown in FIG. 4(f), current $i_{Ls}$ continues to increase linearly after time $t=T_6$, while current $i_D$ of rectifier 109 continues to decrease linearly. The rate of change of current $i_D$ of rectifier 109 is determined by the inductance value $L_S$ of inductor 304 because both rectifier 109 and antiparallel diode 105 are conducting, so that:

$$di_D/dt=-V_O/L_S \quad (2)$$

A properly selected inductance value $L_s$ for inductor 304 reduces both the rectifier-recovered charge and the associated losses. Generally, a larger $L_S$ gives a lower rate of current change ($di_D/dt$) in rectifier 109 and results in a more efficient reduction of the reverse-recovery-associated losses. Without residue stored charge in rectifier 109, current $i_{L_S}$ of inductor 304 would reach its maximum at time $t=T_7$, when current $i_{L_S}$ reaches the input current level $I_{in}$, and current $i_D$ of rectifier 109 reaches zero. However, as shown in FIG. 4(g), due to residual stored charge, current $i_D$ of rectifier 109 becomes a negative reverse-recovery current at time $t=T_7$, so that the current in inductor 304 overshoots the input current level $I_{in}$. Without the inductance $L_S$ of inductor 304, this negative reverse-recovery current would be many times larger. Once rectifier 109 has recovered at $t=T_8$, as shown in FIG. 4(h), input current $I_{in}$ flows through boost switch 201, until the next switching cycle begins at $t=T_9$.

As mentioned above, the junction capacitance of rectifier 109 is assumed to be negligible in the above description. However, in any practical boost converter circuit, rectifier 109's junction capacitance interacts with the inductance $L_s$ of inductor 304, thereby resulting in an undesirable parasitic ringing of voltage $V_D$ after rectifier 109 has recovered at time $t=T_8$. This ringing significantly increases the voltage stress on rectifier 109. The ringing is prevented by clamping diode 103, as shown in FIG. 2a. With clamping diode 103, the voltage stress of boost rectifier 109 is the same as that in a conventional "hard"-switched converter (i.e., the voltage stress in boost rectifier 109 is equal to $V_O$).

As explained earlier, the condition of equation (1) above provides a ZVS condition for switching boost switch 201. Since current $i_{L_s}$ of inductor 304 is proportional to the output load current (i.e., the current modeled in resistor 112), the energy stored in inductor 304 is proportional to the square of the output load current. Consequently, the ZVS condition in equation (1) is more readily satisfied at a larger output load and, at a light output load, boost switch 201 may not operate under a ZVS condition. However, auxiliary switch 202 operates under ZVS condition throughout virtually the entire range of output loads, since energy stored in boost inductor 102, which is much larger than inductance $L_S$ of inductor 304 discharges the output capacitance of auxiliary switch 202.

As shown in FIG. 5, the voltage stress $v_s$ of boost switch 201 is $V_O+(N_1/N_2)(V_O-V_C)$, whereas the stress $v_{s1}$ in auxiliary switch 202 is $(1+N_2/N_1)V_O-V_C$. Therefore, the voltage stress of boost switch 201 under the present invention is higher than a conventional hard-switched boost converter by the amount $(N_1/N_2)(V_O-V_C)$. A properly selected clamping voltage for clamping capacitor 110 keeps the voltage stresses on boost and auxiliary switches 201 and 202 within reasonable limits.

As discussed above, during the time interval $[T_1, T_4]$, the rate of change of current $i_C$ of clamping capacitor 110 is given by $di_C/dt=(N_1/N_2)^2(V_O-V_C)/L_S$. Therefore, at time $t=T_1$, current $i_C$ is given by $(N_1/N_2)i_{Ls}=(N_1/N_2)I_{in}^*$, which is approximately equal to $(N_1/N_2)I_{in}$, and since the duration of the time interval $[T_1-T_3]$ is approximately one-half of the off-time of boost switch 201, voltage $V_C$ of clamping capacitor can be approximated by:

$$V_C = V_O - L_S \frac{(N_2/N_1)I_{in}}{(1-D)T_S/2} = V_O - 2\left(\frac{N_2}{N_1}\right)\frac{L_S f_S I_{in}}{1-D} \quad (3)$$

where D, $T_s$, and $f_S$ are respectively the duty cycle, the switching period and the switching frequency of boost switch 201. For a lossless boost power stage, $$\frac{V_O}{V_{in}} = \frac{I_{in}}{I_O} = \frac{1}{1-D} \quad (4)$$

Thus, equation (3) can be rewritten as $$V_O - V_C = 2\left(\frac{N_2}{N_1}\right)L_S f_S I_O \left(\frac{V_O}{V_{in}}\right)^2 \quad (5)$$

Consequently, according to equation (5), voltage $V_C$ of clamping capacitor 110 is maximum at full load $I_{o(max)}$ and low line input voltage $V_{in(min)}$. For given input and output specifications, i.e., for given $I_{o(max)}$, $V_{in(min)}$, and $V_O$, voltage $V_C$ of clamping capacitor 110 is minimized by minimizing the $(N_2/N_1)L_S f_S$ product.

Generally, the leakage inductance of coupled-inductor 204 in FIG. 2a should be minimized, since coupled-inductor 204 resonates with the output capacitances of boost switch 201 and auxiliary switch 202 after they are respectively opened at times $t=T_0$ and $t=T_4$. Otherwise, i.e., if the leakage inductance of coupled-inductor 204 is large, parasitic resonances can significantly increase the stresses across boost switch 201 and auxiliary switch 202. The leakage inductance of coupled inductance 204 can be minimized using a bifilar winding technique. Since the energy in these parasitic resonances is typically much lower than the rated avalanche energy of an MOSFET device, these parasitic resonances do not cause a device failure even if the peak voltages of these parasitic resonances are clamped only by the breakdown voltages of the devices. The resonances, however, may have a more dramatic effect on the EMI (i.e., electromagnetic interference) performance.

Boost converter 200 can be controlled the same way as a conventional hard-switched boost converter using conventional gate-driver circuits. Specifically, in an input-current-shaping application, boost converter 200 can be controlled using conventional techniques, such as average current, peak current, or hysteretic control.

In input-current-shaping applications, due to the varying input line voltage and the constant output voltage $V_O$, the duty cycle of boost converter 200 (e.g. the duty cycle of boost switch 201) varies over the period of input line voltage. The duty cycle varies between close to 100%, when the input line voltage is at the zero crossings, and is minimum when the line voltage is at its peak amplitudes. The energy stored in boost inductor 102 is small even when the duty cycle is at close to 100%. Consequently, after boost switch 201 is opened (e.g. at time $t=T_0$), the energy in boost inductor 102 may not be sufficient to charge boost switch 201's output capacitance $C_{OSS}$ to the required voltage $V_O-(N_1/N_2)(V_O-V_C)$ to force antiparallel diode 108 of auxiliary switch 202 to conduct, resulting in auxiliary switch 202 not closing at zero voltage. Consequently, clamping capacitor 110 does not discharge. However, since clamping capacitor 110 is charged for a brief duration whenever auxiliary switch 202 is closed, voltage $V_C$ across clamping capacitor 110 can build up. If voltage $V_C$ exceeds output voltage $V_O$, however, a reset voltage for the core of coupled-inductor 204 is not available, resulting in the core of coupled-inductor 204 saturating.

Figure 2B:
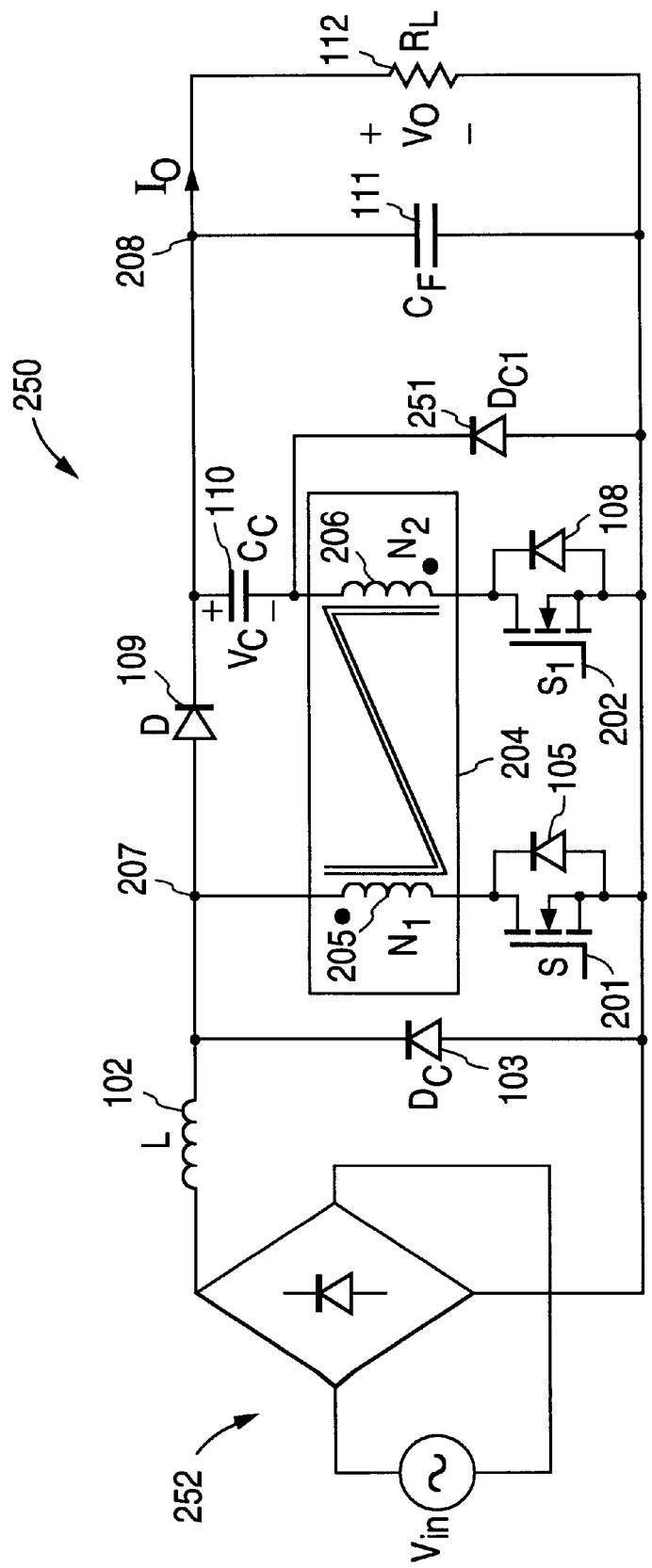
FIG. 2b shows a boost power stage 250 with isolated active snubber, provided in accordance with the present invention.

An additional rectifier can be provided in boost converter 200 to prevent the voltage across clamping capacitor 110 from exceeding the output voltage $V_O$. Such a configuration is shown in boost converter 250, which is shown as an alternative embodiment of the present invention in FIG. 2b. As shown in FIG. 2b, boost converter 250, driven by an AC source 252, includes a clamping diode 251. In boost converter 251, the series connection between secondary winding 206 of coupled-inductor 204 and clamping capacitor 110 is rearranged, such that clamping capacitor 110 is connected between output node 208 (i.e. the "positive" terminal of output capacitor 111) and a terminal of secondary winding 206. Clamping diode 251 clamps the common terminal of clamping capacitor 110 and coupled-inductor 204 to the ground reference. Under this configuration, since voltage $V_C$ across clamping capacitor 110 cannot exceed output voltage $V_O$, the core of coupled-inductor 204 does not saturate.

The performance of an experimental implementation of boost converter 250 was evaluated on a 1 KW (375 volts/ 2.67 A), universal-line-range (90–265 $V_{AC}$) power-factor-correction circuit operating at 80 kHz. The experimental circuit was implemented with the following components: for boost switch 201, an IXFN61N50 MOSFET device; for auxiliary switch 202, an IRFP460 MOSFET device; for boost rectifier 109, a MUR860 diode; for boost inductor 102, an 0.8 mH inductor; for coupled-inductor 204, a 4.7 uH inductor; for clamping capacitor 110, a 1 uF/400 V capacitor; for each of clamping diodes 103 and 251, a MUR860 diode; and for output capacitor 111, a 470 uF/450 V capacitor.

Boost inductor 102 was built using a Magnetics toroidal core (Kool Mu 77439-A7, two cores in parallel) and 55 turns of AWG#14 wire. Coupled-inductor 204 was also built with a Magnetics toroidal core (MPP 55550-A2, two cores in parallel) with $N_1$ and $N_2$ both having 9 bifilarly wound turns of AWG#14 wire. The leakage inductance of coupled-inductor 204 was measured at 250 nH. The control circuit was implemented with an average-current PFC controller UC3854. Additionally, TC4420 and TSC429 drivers are used to generate the required gate-drive signals for boost and auxiliary switches 201 and 202, respectively.

By selecting a 4.7 uH inductor for coupled-inductor 204, the rate of change of current ($di_D/dt$) of boost rectifier 109 was limited to $di_D/dt=V_O/L_S=80$ A/us. In addition, the maximum voltage across clamping capacitor 110, occurring at the minimum line voltage and full load, was limited to approximately 50 V. Also, at an inductance of 4.7 uH for coupled-inductor 204, the experimental converter operates with zero-voltage switching down to 30% of the full load at the minimum line voltage.

Table I compares the measured efficiencies of the experimental converter with and without the isolated active snubber at the minimum and maximum line voltages as a function of the output power. As shown in Table I, the active snubber improves the conversion efficiency in the entire measured power range (300 W to 1 kW) both for the minimum line voltage and the maximum line voltage. Nevertheless, the efficiency improvement is more pronounced at the minimum line voltage and higher power levels, where the reverse-recovery losses are greater. Specifically, at the maximum line voltage (i.e., 265 $V_{AC}$), the efficiency improvement at 1 kW is 0.3%. However, at the minimum line voltage, the experimental implementation without the active snubber cannot deliver more than approximately 700 W, due to a thermal "runaway" phenomenon of boost rectifier 109 caused by an excessive reverse-recovery losses. At the 700 W power level, the active snubber improves the efficiency by approximately 3%, which is approximately a 30% reduction of the losses. Furthermore, at the same power levels, the temperatures of the semiconductor components in the experimental implementation with the active snubber are significantly lower than those in the experimental implementation without the snubber.

TABLE I

| $P_o$ | Without Active Snubber | | With Active Snubber | |
| --- | --- | --- | --- | --- |
| | 90 $V_{AC}$ | 264 $V_{AC}$ | 90 $V_{AC}$ | 264 $V_{AC}$ |
| 300 | 90.9% | 95.5% | 93.9% | 96.7 |
| 400 | 92.0% | 95.3% | 93.7% | 96.9% |
| 500 | 91.9% | 95.6% | 93.9% | 97.1% |
| 600 | 91.4% | 95.8% | 93.7% | 97.1% |
| 700 | n/a | 96.1% | 93.5% | 97.0% |
| 800 | n/a | 96.4% | 93.2% | 97.0% |
| 900 | n/a | 96.6% | 92.7% | 97.0% |
| 1000 | n/a | 96.8% | 92.1% | 97.1% |

Figure 6:
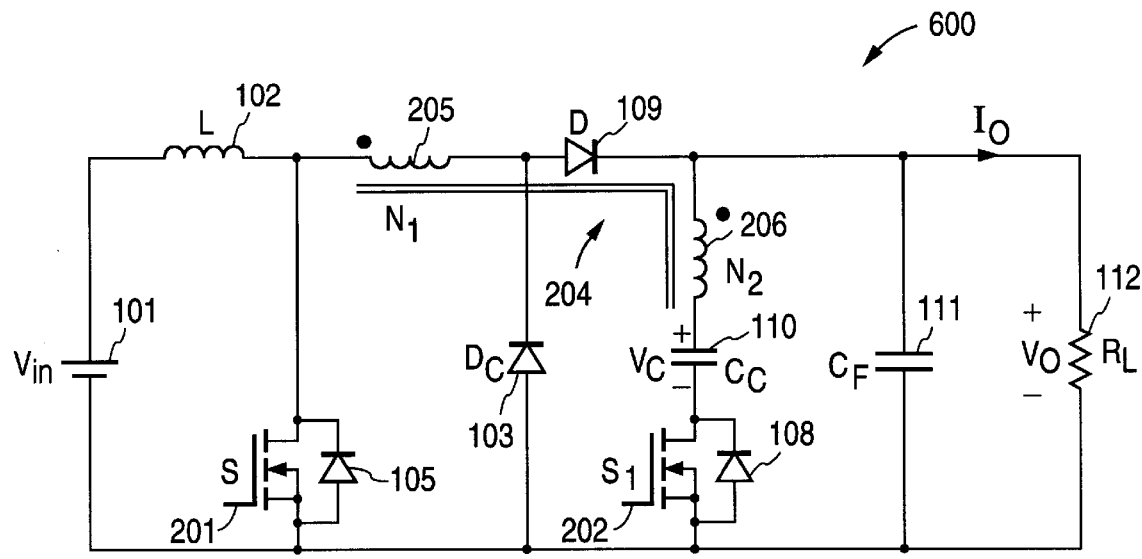
FIG. 6 shows a second embodiment of the present invention in a boost converter 600.
Figure 7:
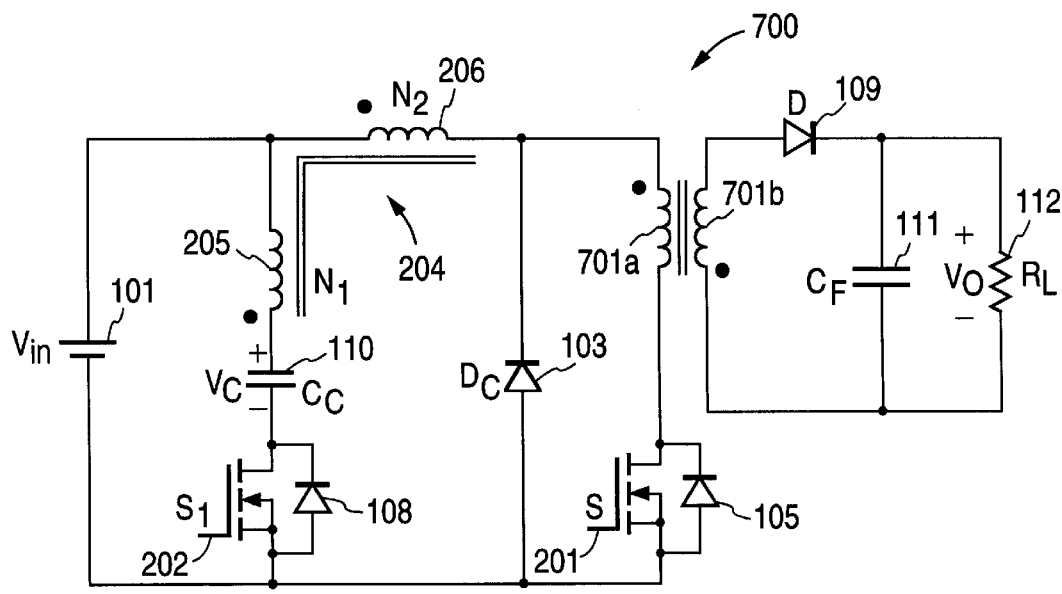
FIG. 7 shows an isolated active snubber provided in a flyback converter 700.
Figure 8:
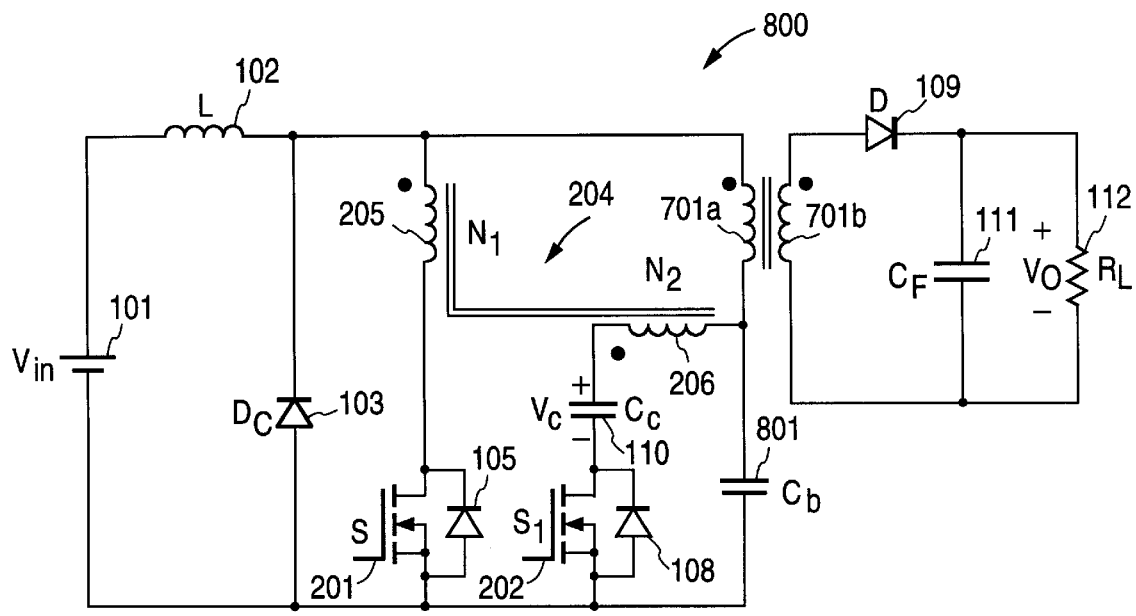
FIG. 8 shows an isolated active snubber provided in a SEPIC converter 800.
Figure 9:
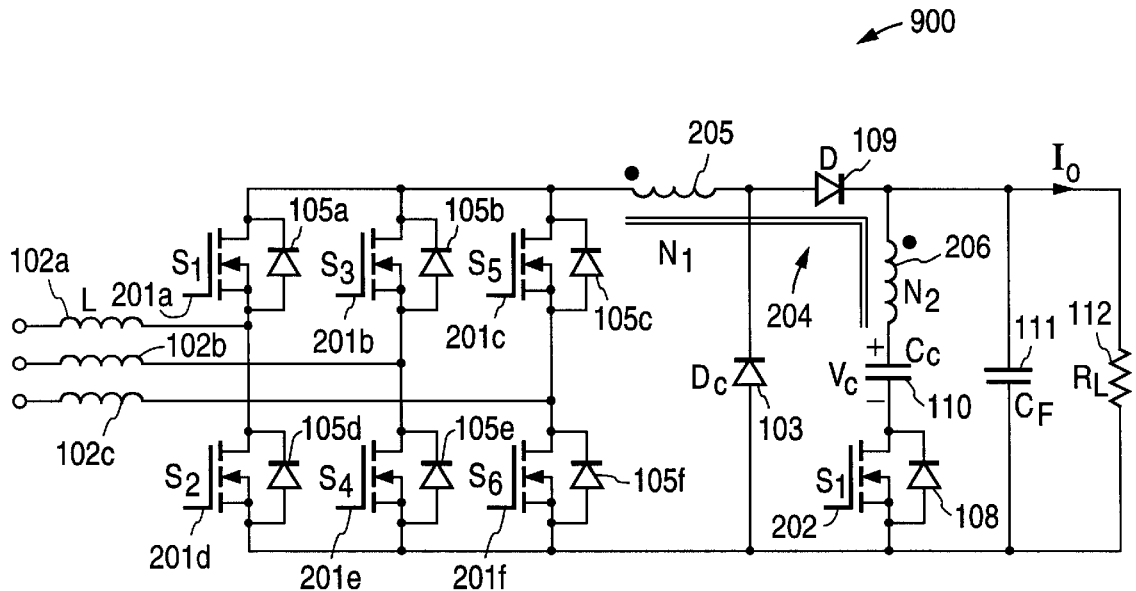
FIG. 9 shows an isolated active snubber provided in a three-phase boost rectifier 900.

Generally, the series connection of auxiliary switch 202, clamping capacitor 110, and secondary winding 206 can be connected to any positive dc-voltage point in a boost converter circuit. Moreover, primary winding 205 can be connected in series with rectifier 109, as shown in FIG. 6. Thus, many modification and variations within the scope of the present invention, with its attendant benefits of reducing reverse-recovery-related losses, are possible. For example, the present invention is applicable to any other, non-isolated or isolated, PWM-converter topology. FIGS. 7 and 8 show the embodiments of the present invention in flyback converter 700 and the SEPIC converter 800, respectively. FIG. 9 shows an embodiment of the present invention in three-phase boost converter 900. In boost converters 700 and 800, the input and output terminals are each isolated by a transformer 701.

The above detailed description is provided to illustrate specific embodiments of the present invention. The present invention is particularly pointed out and distinctly claimed in the following appended claims.

We claim:

1. A converter having an input terminal, an output terminal and a ground reference terminal, comprising:
   an inductor having a first terminal and a second terminal, said first terminal coupled to said input terminal;
   a rectifier coupled between said second terminal of said inductor and said output terminal;
   a first switch;
   a second switch;
   a capacitor; and
   a coupled-inductor having a first winding and a second winding, said first winding coupling said first switch and said rectifier in a first series connection between said ground reference terminal and said output terminal, and said second winding coupling said second switch and said capacitor in a second series connection between said ground reference terminal and said output terminal.

2. A converter as in claim 1, wherein said first winding of said coupled-inductor is provided across said second terminal of said inductor and a terminal of said first switch.

3. A converter as in claim 1, wherein said second winding of said coupled-inductor is provided across a terminal of said capacitor and said output terminal.

4. A converter as in claim 1, wherein said first winding is provided across said second terminal of said inductor and a terminal of said rectifier.

5. A converter as in claim 1, wherein said input and output terminals are isolated by a transformer.

6. A converter as in claim 1, wherein said first and second switches, said rectifier, said inductor and said capacitor are configured in a SEPIC converter configuration.

7. A converter as in claim 1, wherein said first and second switches, said rectifier, said inductor and said capacitor are configured in a three-phase boost converter configuration.

8. A converter as in claim 1, wherein said first and second switches are not simultaneously closed.

9. A converter as in claim 1, further comprising a second rectifier coupled between said ground reference terminal and a terminal of said rectifier.

10. A converter as in claim 1 further comprising a filter capacitor across said output terminal and said ground reference.

11. A converter as in claim 1, wherein said second winding of said coupled-inductor has a first terminal and a second terminal, said first terminal of said second winding being coupled to said output terminal, and said capacitor being coupled across said second winding of said coupled-inductor and said second switch.

12. A converter as in claim 1, wherein said second winding of said coupled-inductor has a first terminal and a second terminal, said capacitor being coupled across said output terminal and said first terminal of said second winding, and said second terminal of said second winding being coupled to said second switch.

13. A converter as in claim 12, further comprising a rectifier coupled between said ground reference and said first terminal of said second winding.

14. A boost converter having an input terminal, an output terminal and a ground reference terminal, comprising:
   an inductor having a first terminal and a second terminal, said first terminal coupled to said input terminal;
   a first rectifier having an anode and a cathode, said anode coupled to said second terminal of said inductor and said cathode coupled to said output terminal;
   a first switch;
   a second switch;
   a capacitor; and
   a coupled-inductor having a first winding and a second winding, said first winding coupling said rectifier in a first series connection between said second terminal of said inductor and said output terminal, and said second winding coupling said second switch and said capacitor in a second series connection between said ground reference terminal and said output terminal.

15. A boost converter as in claim 14, further comprising a second rectifier coupled between said ground reference and said anode of said first rectifier.

16. A boost converter as in claim 14, wherein said boost converter is provided in a three-phase boost converter configuration.

* * * * *